Oct. 25, 1966   L. H. TURNER ETAL   3,281,144
SHEET REGISTRATION DEVICE
Filed Sept. 30, 1964   6 Sheets-Sheet 1

FIG. 1

INVENTORS.
LYMAN H. TURNER
ROBERT H. LIVA
THOMAS P. REDDING
BY
ATTORNEYS

FIG. 2

INVENTORS.
LYMAN H. TURNER
ROBERT H. LIVA
THOMAS P. REDDING
BY
ATTORNEYS

FIG. 3

INVENTORS.
LYMAN H. TURNER
ROBERT H. LIVA
THOMAS P. REDDING
BY
ATTORNEYS

United States Patent Office 3,281,144
Patented Oct. 25, 1966

3,281,144
SHEET REGISTRATION DEVICE
Lyman H. Turner, Pittsford, Robert H. Liva, Henrietta, and Thomas P. Redding, Penfield, N.Y., assignors to Xerox Corporation, Rochester, N.Y., a corporation of New York
Filed Sept. 30, 1964, Ser. No. 400,487
7 Claims. (Cl. 271—53)

This invention relates in general to xerographic apparatus, and, in particular, to a sheet feed mechanism adapted to feed sheets one at a time to a xerographic drum.

More specifically, the invention relates to an improved sheet feed mechanism that is particularly adapted for use in a xerographic reproducing apparatus and is also suitable for use with comparable types of devices.

In automatic xerographic apparatus adapted to effect reproductions on cut sheet material, it is necessary to feed sheets one at a time to the xerographic plate in proper registration with the powder image formed on the xerographic plate whereby the powder image is transferred to the sheet material.

It is, therefore, the principal object of this invention to improve sheet feeding mechanism for seriatim feeding of sheets in timed relation with the formation of the powdered image on the xerographic plate of an automatic xerographic reproducing apparatus.

Another object of this invention is to improve sheet feeding mechanism whereby a sheet advanced is properly aligned before being advanced into contact with a xerographic plate.

For a better understanding of the invention as well as other objects and further features thereof, reference is had to the following detailed description of the invention to be read in connection with the accompanying drawings, wherein:

General

Figure 1:
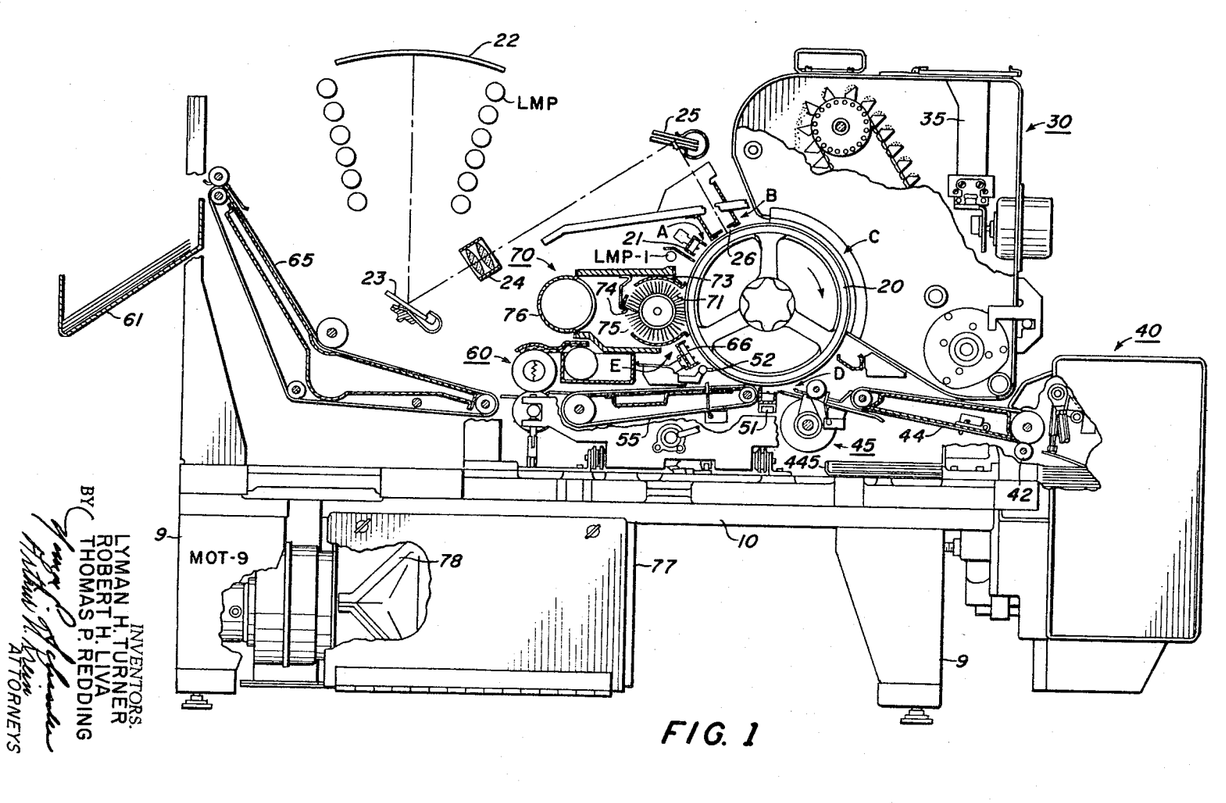
FIG. 1 illustrates schematically a preferred embodiment of a xerographic apparatus constructed in accordance with the invention.

As shown schematically in FIG. 1, the automatic xerographic reproducing apparatus comprises a xerographic plate 20 including a photoconductive layer or light-receiving surface on a conductive backing and formed in the shape of a drum, which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, at which a uniform electrostatic charge is deposited on the photoconductive layer of the xerographic drum;

An exposure station, at which a light or radiation pattern of copy to be reproduced is projected onto the drum surface to dissipate the drum charge in the exposed areas thereof and thereby form a latent electrostatic image of the copy to be reproduced;

A developing station, at which a xerographic developing material including toner particles having an electrostatic charge opposite to that of the electrostatic latent image are cascaded over the drum surface, whereby the toner particles adhere to the electrostatic latent image to form a xerographic powdered image in the configuration of the copy being reproduced;

A transfer station, at which the xerographic powder image is electrostatically transferred from the drum surface to a transfer material or support surface; and, A drum cleaning and discharge station, at which the drum surface is brushed to remove residual toner particles remaining thereon after image transfer, and at which the drum surface is exposed to a relatively bright light source to effect substantially complete discharge of any residual electrostatic charge remaining thereon.

The charging station is preferably located, as indicated by reference character A. As shown, the charging arrangement includes a corona charging device 21 which includes a corona discharge array of one or more corona discharge electrodes that extend transversely across the drum surface and are energized from a high potential source and are substantially closed within a shielding member.

Next subsequent thereto in the path of motion of the xerographic drum is an exposure station B. An optical scanning or projection system is provided to project a flowing image onto the surface of the photoconductive drum from a stationary original.

The optical scanning or projection assembly comprises a stationary copyboard which consists of a transparent curved platen member 22 such as, for example, a glass plate or the like, positioned on the exterior of the cabinet, which is adapted to support a document to be reproduced, the document being uniformly illuminated and arranged in light projecting relation to the moving light-receiving surface of the xerographic drum. Uniform lighting is provided by banks of lamps LMPS arranged on opposite sides of the copyboard. Scanning of the document on the stationary copyboard is accomplished by means of a mirror assembly which is oscillated relative to the copyboard in timed relation to the movement of the xerographic drum.

The mirror assembly, which includes an object mirror 23, is mounted below the copyholder to reflect an image of the document through a lens 24 onto an image mirror 25 which, in turn, reflects the image onto the xerographic drum through a slot in a fixed light shield 26 positioned adjacent to the xerographic drum surface.

Adjacent to the exposure station is a developing station C in which there is positioned a developer apparatus 30 including a casing or housing having a lower or sump portion for accumulating developer material. A bucket type conveyor is used to carry the developing material to the upper part of the developer housing where it is cascaded over a hopper chute onto the xerographic drum to effect development. A toner dispenser 35 is used to accurately meter toner to the developing material as toner particles are consumed during the developing operation.

Positioned next and adjacent to the developing station is the image transfer station D which includes a sheet feeding arrangement adapted to feed sheets of support material, such as paper or the like, successively to the xerographic drum in coordination with the presentation of the developed image on the drum surface at the transfer station.

The sheet feeding mechanism includes a sheet feed device 40 adapted by means of vacuum feeders to feed the top sheet, of a stack of sheets on a tray 41, to rollers 42 cooperating with the belts of paper transport 44 for advancing the sheet sufficiently to be held by paper transport 44 which in turn, conveys the sheet to a sheet registration device 45 positioned adjacent to the xerographic drum. The sheet registration device arrests and aligns each individual sheet of material and then in timed relation to the movement of the xerographic drum, advances the sheet material into contact with the xerographic drum in registration with a previously formed xerographic powder image on the drum.

The transfer of the xerographic powder image from the drum surface to the sheets of support material is effected by means of a corona transfer device 51 that is located at or immediately after the line of contact between the support material and the rotating drum. In operation, the electrostatic field created by the corona transfer device is effective to tack the support material electrostatically to the drum surface, whereby the support material moves synchronously with the drum while in contact therewith. Simultaneously with the tacking action, the electrostatic field is effective to attract the toner particles comprising the xerographic powder image from the drum surface and cause them to adhere electrostatically to the surface of the support material.

Immediately subsequent to the image transfer station, there is positioned a stripping apparatus or paper pick-off mechanism 52 for removing the sheets of support material from the drum surface. This device, which is of the type disclosed in Rutkus et al. United States Patent 3,062,536, includes a plurality of small diameter orifices supplied with pressurized aeriform fluid by a suitable pulsator or other device. The pulsator is adapted to force jets of pressurized aeriform fluid through the outlet orifices into contact with the surface of the xerographic drum slightly in advance of the sheet of support material to strip the leading edge of the sheet from the drum surface and to direct it onto an endless conveyor 55 whereby the sheet material is carried to a fixing device 60. At the fixing device, the transferred xerographic powder image on the sheet of support material is permanently fixed or fused thereto as by heat. After fusing, the reproduction is discharged from the apparatus at a suitable point for collection externally of the apparatus by means of the conveyor 65. In the embodiment shown, the reproductions are discharged from conveyor 65 into a receiving tray 61.

The next and final station in the device is a drum cleaning station E, having positioned therein a corona preclean device 66, a drum cleaning device 70 adapted to remove any powder remaining on the xerographic drum after transfer by means of a rotating brush 71, and a discharge lamp LMP-1 adapted to flood the xerographic drum with light to cause dissipation of any residual electrical charge remaining on the xerographic drum.

To remove residual powder from the xerographic drum, there is disposed a cylindrical brush 71 rotatably mounted on an axle and driven by a motor, not shown. For collecting powder particles removed from the xerographic drum by the brush, there is provided a dust hood 73 that is formed to encompass approximately two-thirds of the brush area. To ensure thorough cleaning of the brush, a flicking bar 74 is secured to the interior of the dust hood adjacent the edge of the outlet duct 75 of the dust hood and in interfering relation with the ends of the brush bristles whereby dust particles may be dislodged therefrom.

For removing dust particles from the brush and dust hood, an exhaust duct 76 is arranged to cover the outlet of the dust hood, the exhaust duct being connected at its other end to the wall of a filter box 77 attached to the dust hood. A filter bag 78 is secured within the filter box, with the mouth of the filter bag in communication with the exhaust duct. Two motor driven fan units, connected to the filter box, produce a flow of air through the filter box drawing air through the area surrounding the xerographic drum and the dust hood, the air entraining powder particles removed from the drum by the brush as the air flows through the dust hood. Powder particles are separated from the air as it flows through the filter bag so that only clean air reaches the motor unit.

Suitable drive means are provided to drive the drum, rotating mirror and sheet feed mechanism at predetermined speeds relative to each other, and to effect operation of the bucket-type conveyor and toner dispenser mechanism and the other operating mechanisms.

Figure 2:
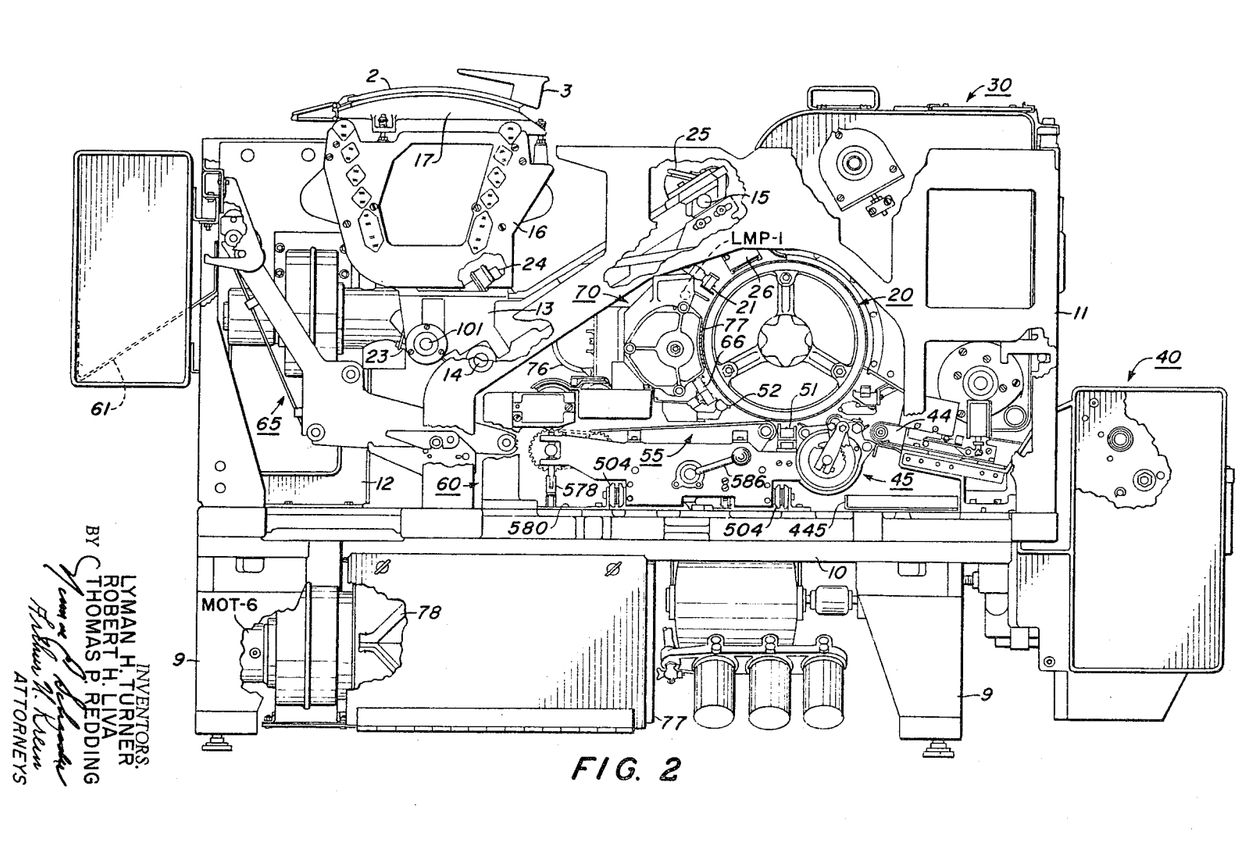
FIG. 2 is a front view of the xerographic apparatus.

Referring now to the drawings, there is provided a frame for supporting the components of the apparatus formed by a base plate 10 supported on legs 9. Vertical outboard and inboard frame plates 11 and 12, respectively, are secured to base plate 10 in spaced relation to each other.

The xerographic drum 20 is mounted on a horizontal driven shaft and the drum is positioned between frames 11 and 12, with the major xerographic components of the machine mounted around the drum.

It is believed that the foregoing description is sufficient for the purposes of this application to show the general operation of a xerographic reproducing apparatus using a sheet registration device constructed in accordance with the invention. For further details concerning the specific construction of the xerographic apparatus shown, reference is made to copending application, Serial No. 400,363, filed concurrently herewith on September 30, 1964, in the name of R. F. Osborne et al.

Referring now to the subject matter of the invention, single sheets of paper separated and fed by the sheet feed mechanism 40 is further advanced by paper transport 44 to a sheet registration device 45 whereat the leading edge of a sheet is aligned and then advanced to the xerographic drum in registration with a previously developed image thereon. Transfer of the developed image on the drum to the sheet of paper is effected electrostatically by corona transfer device 51. After transfer, the sheet is separated from the drum by sheet pick-off device 52, the sheet dropping onto endless conveyor 55 to be forwarded thereby to fuser 60.

Figure 3:
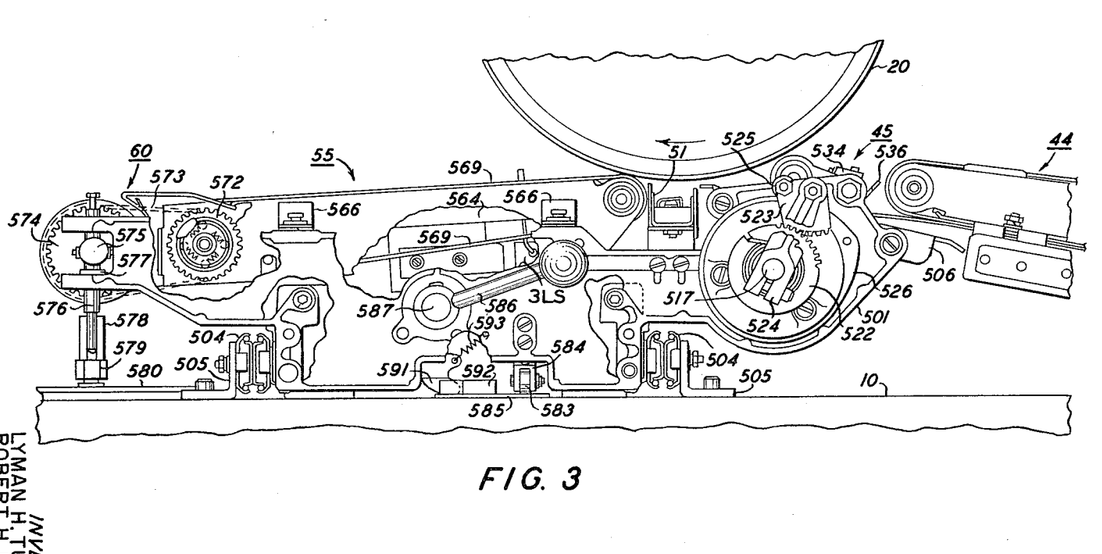
FIG. 3 is a front view of the drawer assembly of the apparatus supporting the sheet registration device, corona transfer device, an endless conveyor and the bottom roll of the fusing device of the xerographic apparatus.

In the embodiment of the xerographic apparatus shown, sheet registration device 45, corona transfer device 51 and endless conveyor 55 and the bottom roll of fixing device 60 are supported on a frame assembly or drawer formed as a separate unit from the main frame of the machine. The frame assembly or drawer supporting these elements may be moved as a unit away from the xerographic drum to permit access to the paper path.

As shown, the frame assembly or drawer includes an outboard frame 501 and an inboard frame 502 held in rigid spaced relation to each other by tie bar frame 503. This frame assembly supports one portion of drawer slides 504, the mating portion of which are secured to angle rail supports 505 fastened to the base plate 10 of the main machine frame.

In the normal operation of the sheet feed system, that is, when a single sheet has been separated from the stack and fed to the paper transport, the sheet is advanced toward the drum by paper transport 44. Single sheets thus advanced are guided by the feed table 506 of the sheet registration device 45 toward a set of feed rollers 511 and 512 which will direct the sheet into contact with the peripheral surface of the xerographic drum. Before a sheet can be advanced by the feed rollers 511 and 512, feed roller 512 is lifted out of cooperating relation with feed roller 511 and the forward progress of the sheet is momentarily stopped by register stops 513 mounted for rotation with the feed rollers 511.

The register stops 513 are used to align the leading edge of the sheet parallel to the axis of the drum and to restrain the forward progress of the sheet for a very short period of time so that the final advancement of the sheet to the drum is timed for proper registration with a developed xerographic image previously formed on the drum surface.

Figure 4:
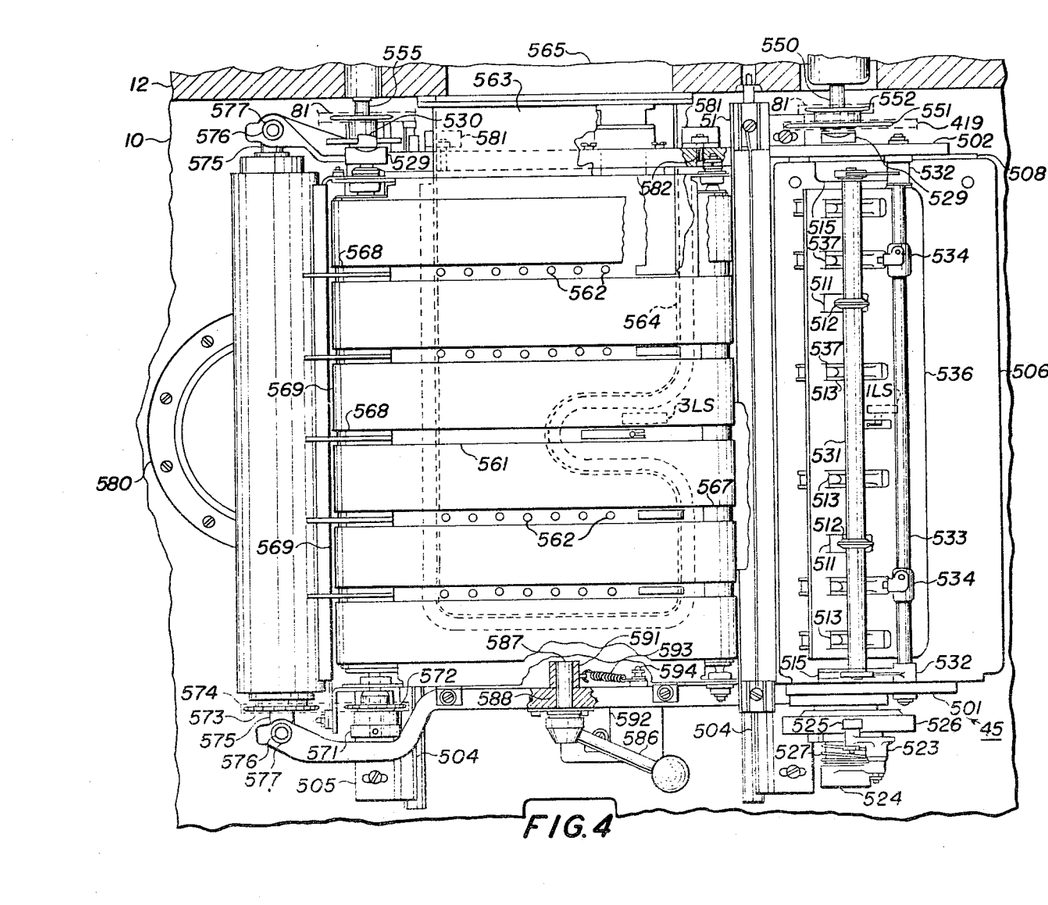
FIG. 4 is a top view of the apparatus of FIG. 3.

As shown in FIG. 4, the feed table 506 which extends between frames 501 and 502 is connected at one end to frame 501 and at its other end is fixed to bracket 508 attached to frame 502. The feed table 506 is provided with slots 507 through which the feed rollers 511 and register stops 513 extend. The upper paper guide 536 is also provided with slots 537 in alignment with the slots in the feed table.

Figure 6:
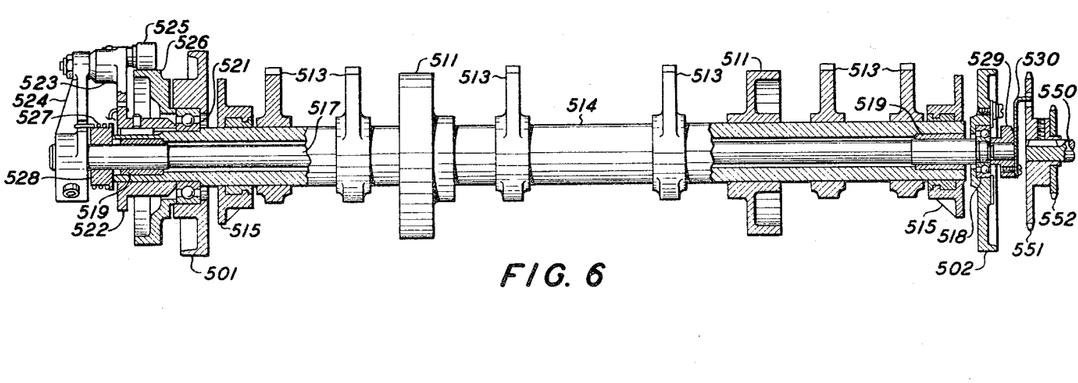
FIG. 6 is a sectional view of the shaft assembly of the sheet registration device of FIG. 3.

The feed rollers 511 and register stops 513 are fixed to an outer shaft 514 for rotation therewith, the outer shaft also supporting lift cams 515. As shown in FIG. 6, the outer shaft 514 encircles an inner shaft 517 which is journaled at one end by bearing 518 positioned in frame 502 and by bearings 519 positioned within outer shaft 514 rotatably supported at its left-hand end by bearing 521 mounted in outboard frame 501, whereby either the outer shaft or inner shaft can be rotated with respect to each other.

The outer shaft 514 encircling shaft 517 is thus mounted about the axis of the inner shaft to be rotated at varying speed by segment gear 522 fixed to the outer shaft in driven engagement with the segmented gear 523 rotatably carried by the drive arm 524 fixed at the outboard end of the inner shaft to rotate with the inner shaft. The inner shaft is driven at a fixed rotative speed in timed relation to the xerographic drum so that, normally, the peripheral speed of the feed rollers 511 is substantially equal to the peripheral speed of the xerographic drum.

However, in order to effect sheet registration, the rotative speed of the outer shaft 514 and therefore the rotative speed of the register stops 513 and feed rollers 511 is first increased and then decreased with respect to the rotative speed of the inner shaft to allow the sheets to become registered.

This is accomplished by changing the location of the driving engagement between the segmented gears 522 and 523, that is, while the shafts 514 and 517 are being rotated through the engagement of these gears, segmented gear 523 is caused to oscillate thereby first effectively trying to drive gear 522 in the same direction of rotation and then to rotate gear 522 in the opposite direction as the direction of rotation of these shafts.

As seen in FIGS. 7a, 7b, 7c, 7d and 7e, this sequence is effected by cam follower 525 riding on cam 526 which is fixed to frame 501 in position to encircle the outer shaft and the hub of segmented gear 522. The cam follower 525 is journaled on an arm of the segmented gear 523 and is biased into contact with the cam by coiled spring 527 encircling spring hub 528, one end of the spring being secured to the drive arm 524 and the opposite end of the spring being connected to the gear 522. The spring 527 also tends to cause the arm 524 and therefore the gear 523 to rotate in a counterclockwise direction as seen in these figures.

Figure 7A:
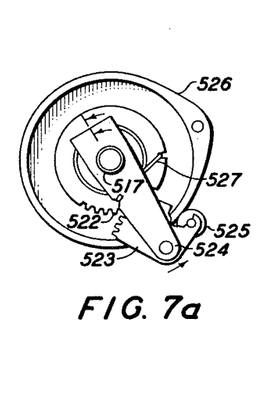
FIGS. 7a, 7b, 7c, 7d and 7e are time sequence views of the operation of the sheet registration device.

Referring to FIG. 7a, with the cam follower 525 riding on the dwell portion of the cam 526, the outer shaft is rotated in the direction shown at the same speed as the inner shaft through the above-described drive connection.

Figure 7B:
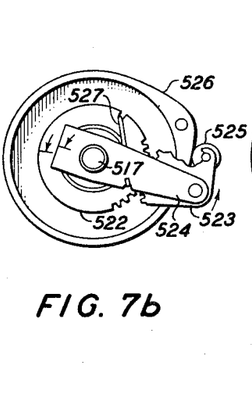
Figure 7C:
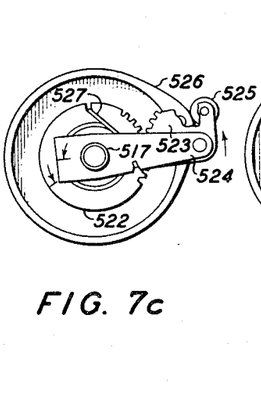

As the cam follower rides up on the rise portion of cam 526, as seen in FIGS. 7b and 7c, the gear 523 is rotated in a clockwise direction driving gear 522 counterclockwise to increase the rotative speed of the outer shaft relative to the rotative speed of the inner shaft. This continues until the cam follower completes its ride up the rise of the cam and then as the cam follower begins to ride down the fall of the cam, the inner shaft continues to rotate while the outer shaft is beginning to rotate at a speed less than the rotative speed of the inner shaft. In effect, the outer shaft appears to be momentarily stopped while the inner shaft catches up to the outer shaft, as seen by the index marks in these figures. The register stops are mounted on the outer shaft so that their stop portions are positioned in the path of paper travel to stop and align the sheet.

Figures 7D, 7E:
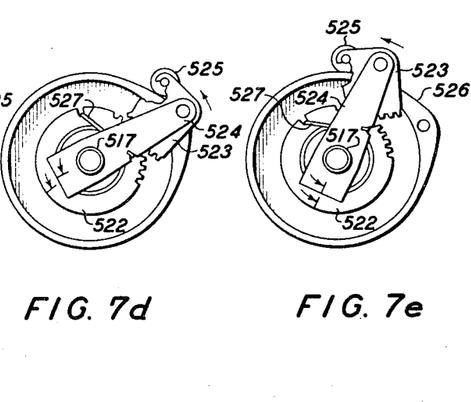

As the cam follower again rides on the dwell portion of the cam 526, the inner shaft and outer shaft will again be rotated at the same speed as seen in FIG. 7e and will continue at this equal speed through the position shown in FIG. 7a. During this period, a sheet previously registered in the manner just described, is advanced by the rollers 511 and 512 into contact with the drum, further advance of the sheet being effected by the drum. As a sheet is forwarded, it will contact the actuator of limit switch 1–LS suitably supported beneath feed table 506 for a purpose which need not be described in detail since it forms no part of the subject invention.

Figure 5:
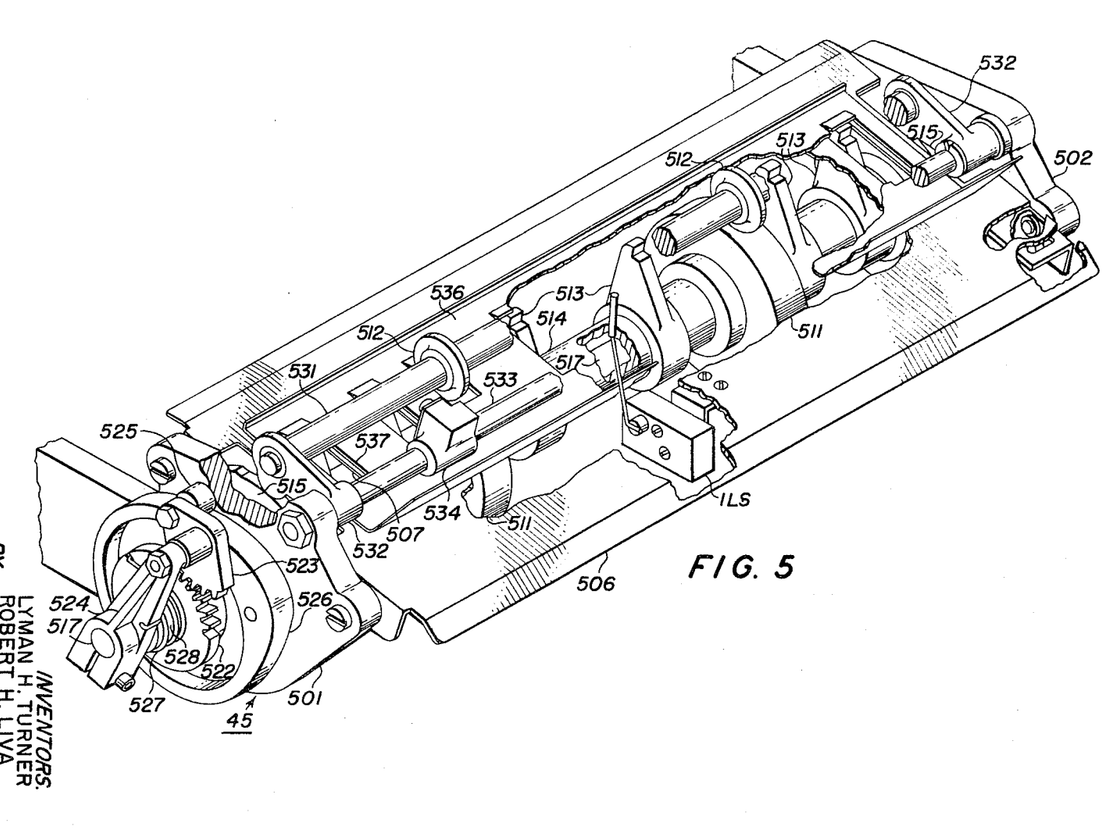
FIG. 5 is a perspective view of the sheet registration device of FIG. 3.

The feed rollers 512 which are actually idler rollers are mounted on shaft 531 journaled at opposite ends in one end of cam follower arms 532, the opposite ends of which are rotatably supported on support rod 533 fixed to frames 501 and 502. The cam follower arms are positioned to ride on the lift cams 515 which are mounted on the outer shaft 514 with their rise portions angularly displaced to effect lifting of the feed rollers 512 out of cooperating relation with feed rollers 511 as a sheet is being registered by the register stops. Support rod 533 is also provided with support blocks 534 to which the upper paper guide 536 is attached.

To effect rotation of inner shaft 517, it is provided at its inboard end with drive nut 529 having fastened thereon a drive arm 530. The turned out portion of the drive arm 530 is adapted to engage an aperture in clutch sprocket 551 mounted with sprocket 552 on the timing shaft 550 of a timing device driven by the main drive system of the xerographic apparatus. The main drive system is not described since it forms no part of the subject invention.

With this arrangement, there is provided a releasable clutch drive for the sheet registration device 45 on the drawer permit withdrawal of the drawer as desired.

The timing shaft 550 is rotated by sprocket 552, through the main drive system, at a speed directly related to the drum speed, which speed is also related to the speed of scanning of an image for projection onto the drum as disclosed in the referenced copending application Serial No. 400,363. The register stop is rotated out of interference relation to a sheet to allow the sheet to be advanced to the drum at a predetermined interval after start of scanning as controlled by the fall of the scan cam and its rate of rotation with respect to the drum.

The transfer of the xerographic powder image from the drum surface to the sheet thus advanced to the drum is effected by the corona transfer device 51 supported between frames 501 and 502 adjacent the drum at or immediately after the point of contact between the sheet and the rotating drum. A suitable electrical contact 541 is mounted on frame 502 to engage another contact 542 supported on the frame 12 whereby the corona transfer device is connected to the electrical circuit of the machine. In operation, the electrostatic field created by the corona transfer device is effective to tack the sheet electrostatically to the drum surface, whereby the sheet moves synchronously with the drum while in contact therewith. Simultaneously with the tacking action, the electrostatic field is effective to attract the toner particles comprising the developed image from the drum surface and cause them to adhere electrostatically to the surface of the sheet.

After transfer, the leading edge of the sheet is separated from the drum by the sheet pick-off mechanism 52, the remainder of the sheet then peeling off the drum due to its own weight to fall onto the belts of endless conveyor 55 which transport the sheet to heat fuser 60.

Endless conveyor 55 includes a transverse extending guide plate 561 secured by angle brackets 566 to frames 501 and 502; a flanged cover 564 is secured as by spot welding to the underside of guide plate 561 forming therewith a vacuum manifold having a number of inlet apertures 562 formed in the guide plate and a discharge connection 563 in communication with a suitable aperture in inboard frame 12 which is connected by conduit 565 to a vacuum pump. Suitable gaskets are provided between discharge connection 563 and frame 12.

Sheets pulled toward the guide plate by suction through inlet apertures 562 are carried by belts 569 looped over idler roller 567 and driven roller 568 suitably journaled in the depending portions of guide plate 561.

The driven roller 568 has connected thereto at its inboard end a drive nut 529 and drive arm 530, the turned out portion of the drive arm being adapted to engage an aperture in clutch plate 553 mounted with sprocket 554 on an idler shaft 555 suitably journaled in frame 12. The outboard end of driven roller 568 is provided with a stub shaft portion fixed to rotate with the driven roller and carrying at its outboard end an overriding clutch 571, for example, a Miniclutch No. HV64A6A manufactured by the Miniclutch Co., Hamden, Connecticut. The driven portion of this clutch has fixed to it a sprocket 572 which is connected by chain 573 and sprocket 574 on the bottom roll of fuser 60 to drive this roll of the heat fuser.

The bottom roll of the fuser 60 is journaled on a fuser shaft 575 which is fixed at its opposite ends to guide rods 576 journaled by bearings 577 for vertical movement in the bifuricated ends of frames 501 and 502. The lower portions of these guide rods are secured to a fuser lift bar 578 which is actuated by a plunger 579 connected to an air actuated diaphragm 580 controlled in a manner to be described.

A miss detector limit switch 3LS is secured by a suitable bracket in a position whereby the actuator of the limit switch extends through an aperture in guide plate 561 into the path of paper travel, for a purpose which need not be described in detail since it forms no part of the subject invention.

As previously described, the frame assembly, carrying sheet registration device 45, corona transfer device 51 and endless conveyor 55, is slidably mounted by means of drawer slides 504.

To insure proper alignment of these components with the xerographic drum, the brackets 581, secured to base plate 10, are provided with locating pins 582 adapted to engage suitable locating apertures formed in the frame 502.

The frame assembly is aligned vertically by cam follower 583 journaled on bracket assembly 584 fixed to this frame, which is adapted to slide onto the locating ramp of a cam plate 585 secured to base plate 10 in position to engage the cam follower as this assembly is pushed parallel to the drum.

Complete withdrawal of this assembly is prevented by suitable stops positioned on the drawer slides 504.

This entire assembly is locked into operative relation with the xerographic drum by manual operation of lever arm 586. The lever arm 586 is fixed to one end of shaft 587 journaled by bearing 588 on frame 501, a locking cam 591 being fixed to the opposite end of the shaft 587 in position to engage a cam plate 592 fixed to the base plate 10. The locking cam 591 is normally held in locking engagement with the cam plate by spring 593 fixed at one end to the locking cam and at its other end to pin 594 extending from frame 501.

Although the sheet registration device is shown, in the preferred embodiment, as being mounted on a movable drawer assembly of the machine and being driven through a clutch drive, it is apparent that the sheet registration device can be constructed integral with the frame of the machine and directly driven through any suitable drive mechanism.

While the invention has been described with reference to the structure disclosed herein, it is not to be confined to the specific details set forth or to the specific environment set forth, as, for example, it is apparent that the apparatus may be modified as described above or it may be used in other type devices to effect sheet registration. Other modifications or changes may readily become apparent to those skilled in the art, and, therefore, this application is intended to cover such modifications or changes as may come within the purposes of the improvements or the scope of the following claims.

What is claimed is:

1. In a sheet feed mechanism,
a first shaft journaled for rotation,
a first feed roll mounted on said first shaft for continous rotation therewith,
a second feed roll journaled for rotation,
bias means to normally bias said second feed roll into cooperative relation with said first feed roll to advance a sheet therebetween,
a register stop mounted on said first shaft, said register stop having a stop portion adapted to be moved into interference relation with the path of travel of a sheet forwarded between said first feed roll and said second feed roll,
a second shaft journaled for rotation,
drive means connected to said second shaft to rotate said second shaft at a predetermined fixed rate,
variable speed driven means connected between said second shaft and said first shaft whereby said first shaft is driven by said second shaft at various speeds with respect to said second shaft thereby rapidly advancing said stop portion of said register stop into the path of travel of a sheet, then rapidly retarding said stop portion to effect alignment and registration of a sheet and then rotating said first shaft and therefore said register stop and said first feed roll at the same rotative speed as said second shaft.

2. The apparatus of claim 1 wherein said variable speed driven means includes:
a first segmented gear fixed to said first shaft;
a cam encircling said first shaft;
a lever arm connected to said second shaft;
a second segmented gear pivotally secured to said lever arm in engagement with said first segmented gear; and,
cam follower means mounted on said second segmented gear in position to engage said cam.

3. The apparatus of claim 2, wherein said second shaft is mounted within said first shaft.

4. The apparatus of claim 1 including:
cam means secured to said first shaft, and,
cam follower means operatively connected to said second feed roll and positioned in cooperative relation with said cam means to lift said second feed roll out of operating relation with said first feed roll as said stop portion of said register stop is advanced into the path of travel of a sheet.

5. In a sheet advancing mechanism of the type wherein sheets are forwarded in a path of movement through a feed roller and a pressure roller which is moved into and out of engagement with the feed roller, apparatus for registering and aligning sheets as they are fed through the feed and pressure rollers including
a sheet register stop extending radially outward from a feed roller into interference relationship with a path of movement of a sheet,
drive means for continuously revolving said feed roller, and
control means to vary the angular velocity of the register stop in relation to the position of a sheet moving through said path of movement by varying the speed of rotation of the feed roller so that the leading edge of the sheet is intercepted by the stop prior to movement of the pressure roller into engagement with the feed roller and the stop is accelerated out of the path of movement of the sheet after engagement of the pressure roller.

6. The apparatus of claim 5 wherein said control means includes
an output gear secured to the feed roller,
a drive member which is a constant speed input source,
a bell-crank lever pivotally connected to the drive member and having a cam follower on one arm and a gear sector on the other arm,
the gear sector being positioned to drive the output gear as the drive member revolves and as the bell-crank lever pivots about the drive member,
a control cam surface affixed in a position to cooperate with said cam follower to pivot the bell-crank lever about the drive member as the drive member revolves so that the speed of the output gear is varied by the gear sector in accordance with the cam surface.

7. The apparatus of claim 6 wherein said drive member includes a drive lever secured to and rotated with an input shaft.

References Cited by the Examiner

UNITED STATES PATENTS 2,246,508  6/1941  Davidson _____________ 271—53

FOREIGN PATENTS 699,477  11/1940  Germany.

M. HENSON WOOD, JR., *Primary Examiner.*

J. N. ERLICH, *Assistant Examiner.*